United States Patent [19]
Zimmerly

[11] Patent Number: 6,056,270
[45] Date of Patent: May 2, 2000

[54] VALVE GASKET FORMED OF COMPOSITE MATERIALS AND PROCESS

[75] Inventor: Robert D Zimmerly, Kenosha, Wis.

[73] Assignee: Tri-Clover, Inc., Kenosha, Wis.

[21] Appl. No.: 09/078,022

[22] Filed: May 13, 1998

[51] Int. Cl.[7] .................................................. F16K 31/02
[52] U.S. Cl. ........................ 251/368; 251/356; 251/357; 137/15
[58] Field of Search .................... 251/356, 357, 251/368; 137/15, 315

[56] References Cited

U.S. PATENT DOCUMENTS

| | | | |
|---|---|---|---|
| 3,531,086 | 9/1970 | Shannon | 251/356 |
| 3,775,832 | 12/1973 | Werra . | |
| 3,861,646 | 1/1975 | Douglas | 251/356 |
| 4,237,010 | 12/1980 | Zimmerly . | |
| 4,408,745 | 10/1983 | Swiers et al. | 251/357 |
| 4,531,532 | 7/1985 | Zimmerly . | |
| 4,628,959 | 12/1986 | Parker et al. | 251/368 |

*Primary Examiner*—A. Michael Chambers
*Attorney, Agent, or Firm*—Ryan Kromholz & Manion, S.C.

[57] ABSTRACT

A valve gasket includes a main body portion formed of an elastomeric material having a high hardness durometer. The main body portion has recesses located on its opposite sides and at least one opening through the body connecting the recesses. The opposed recesses and the opening are filled with an elastomeric material having a hardness of a lesser durometer, softer than that of the main body portion. At least one of the filled recesses forms a sealing surface of the gasket. In a preferred embodiment both filled recesses form sealing surfaces, one to the seat and one to the stem. In one embodiment the gasket is generally ring-shaped in configuration and the opposed recesses are on opposite sides of the ring and each circumscribe the circumference of the ring.

9 Claims, 3 Drawing Sheets

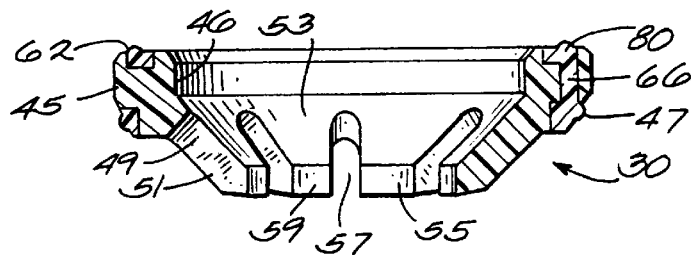
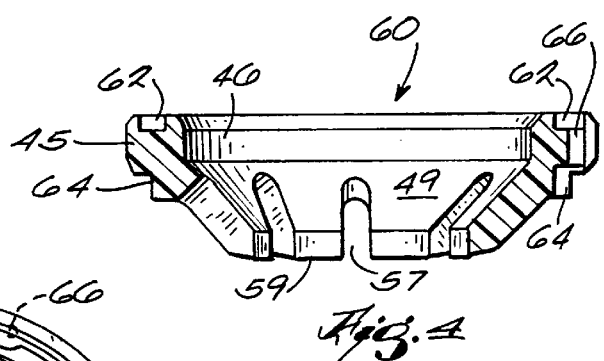
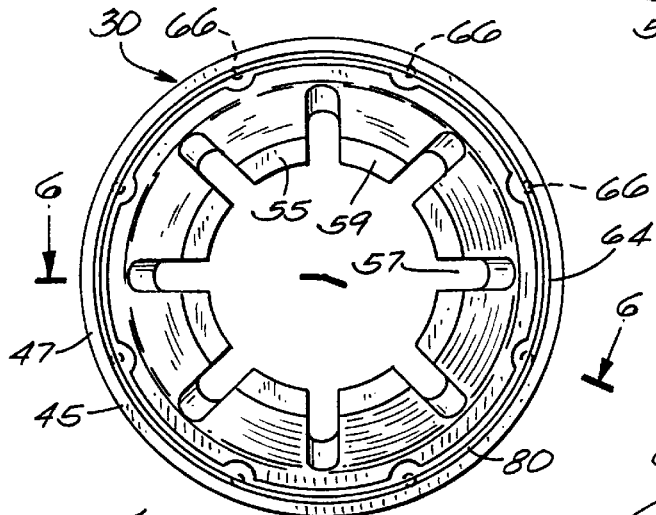
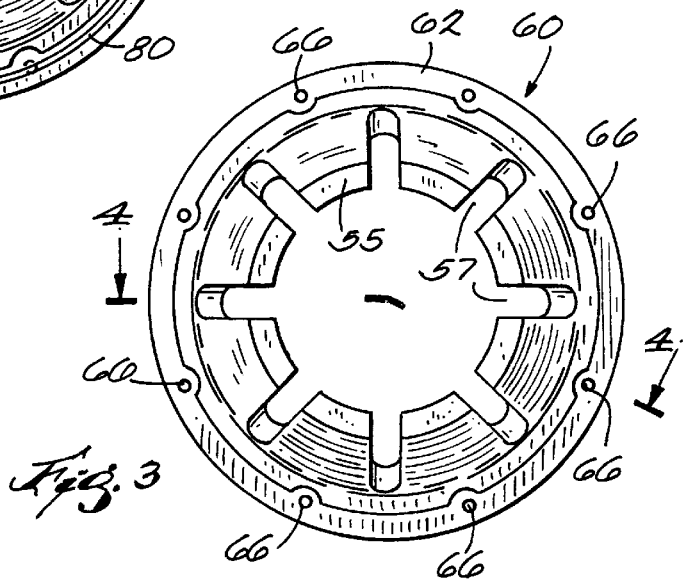

VALVE GASKET FORMED OF COMPOSITE MATERIALS AND PROCESS

The present invention relates to gaskets for fluid flow valves. More particularly, the invention relates to valve gaskets formed of composite elastomeric or plastic materials which include a relatively hard non-deformable portion and at least one more readily deformable resilient portion. The invention also relates to a process to forming such composite gaskets.

BACKGROUND OF THE INVENTION

It has long been known to equip valve surfaces used in fluid flow control equipment with gaskets formed of relatively soft rubber or similar elastomeric materials. In other applications it has been known to utilize more rigid synthetic plastics such as polytetrafluorethylene (PTFE) as a replaceable valve gasket component. See for example my U.S. Pat. No. 4,531,532.

Often gasket materials are selected on the basis of a compromise between a need for dimensional stability of the materials, usually provided by hard plastics or high durometer elastomers, and, on the other hand, the need for the sealing surfaces of the gaskets to be soft and compressible to provide good sealing efficiency. Other situations requiring compromise arise where, for example, the operating temperatures of the valve system are such that none of the existing materials are entirely suitable.

In view of these various limitations, a need has continued to exist for gasket materials which combine such advantages as dimensional stability, abuse tolerance, temperature stability and softness and compressibility.

SUMMARY OF THE INVENTION

An important object of the invention to provide gaskets which have main body portions formed of a harder less deformable material and compressible sealing surfaces formed of relatively soft deformable materials. A related object is to provide a process for forming gaskets of composite materials.

Related aspects of the invention are the provision of such gaskets which have sufficient rigidity in the main body portion to serve as "snap-on" gaskets of the type shown in my above-noted '532 patent, while at the same time having sealing surfaces adapted to engage a valve seat and stem and which are substantially more yieldable and hence better adapted to sealing the engaged valve surfaces to a degree not obtainable with the materials of the less yieldable main body portion.

Related further aspects include provision of a main body portion of a gasket in which openings are provided through the relatively harder material and through which the softer material is molded with the result that some of the relatively softer material is positioned on each end of the openings and, thus, on opposite sides of the gasket. An appropriate bonding agent is used to firmly anchor the softer material in place on the gasket main body portion. In accordance with this aspect, the softer material forms the sealing surface of the gasket and is anchored to two sides of the main body portion. In some embodiments, depending on the specific valve configuration, either or both sides may act as sealing surfaces of the valve gasket.

Briefly, in accordance with the invention, a valve gasket includes a main body portion formed of a relatively hard polymeric material having a relatively higher durometer hardness. This main body portion has recesses located on its opposite sides and at least one opening through the body connecting the recesses. The opposed recesses and the opening are filled with a softer and more yieldable elastomeric material having a hardness of a lesser durometer than that of the main body portion. At least one and preferably both of the filled recesses forms a sealing surface of the gasket. In one embodiment the gasket is generally ring-shaped in configuration and the opposed recesses are on opposite sides of the ring and each circumscribe the circumference of the ring.

Further objects and advantages of the invention will become apparent from the following detailed description, the claims, and the accompanying drawings.

BRIEF DESCRIPTION OF THE DRAWINGS

FIG. 3 is a top planned view of a blank which forms the more rigid body portion of a valve gasket in accordance with the invention;

FIG. 4 is a sectional view taken along line 4—4 of FIG. 3;

FIG. 5 is a top planned view of the gasket formed by molding a relatively soft material onto the blank of FIG. 3;

FIG. 6 is a sectional view taken along line 6—6 of FIG. 5;

DETAILED DESCRIPTION OF THE INVENTION

Figure 1:
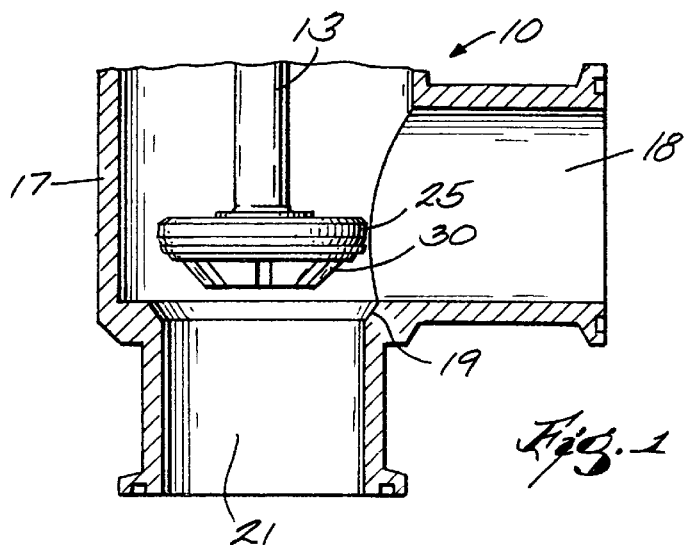
FIG. 1 is a side view, partly in section, of one form of a food flow control apparatus which incorporates a valve using a gasket of the present invention, showing the valve stem assembly in the open position.

Referring to FIG. 1, a fluid control valve 10 is illustrated which includes a gasket 30 of the present invention. The valve finds particular usefulness in handling liquid and viscous food products and beverages. However, it will be understood that the invention is not limited to sanitary applications.

The control valve 10 includes an actuator (not shown). Reference is made to my above-noted '532 patent for additional details of the control valve assembly. The valve mechanism is assembled to a valve body portion 17 having ports 18 and 21. The valve stem shaft 13 operates the valve stem assembly 25 which is actuated in a linear direction along the longitudinal axis of the valve stem shaft 13.

In FIG. 1, the valve is shown in the open position so that fluid entering port 21 may flow out of port 18. The assembly 25 includes a gasket 30. To retain the gasket 30 on the valve stem end, shoulders are provided as described in the '532 patent. These shoulders retain the gasket on the valve stem 13 and to support the gasket when it is pressed against the valve seat 19.

As described in the '532 patent, gasket 30 is constructed with an annular ring 45 of generally rectangular cross-section. Ring internal surface 46 is shaped to correspond with a valve stem plug 25 for which it is adapted. Sealing surface 47 is shaped to contact and provide a seal with valve seat 19. Gasket 30 includes a hollow frustoconical section 49 which extends from one side of the ring 45. The section 49 is defined by generally parallel and external and internal surfaces 51 and 53, respectively. Inner surface 53 corresponds to the surface of valve stem 25. To allow quick and economical field replacement of the gasket 30, the frustoconical section 49 is formed with a plurality of slots 57. The slots extend from surface 55 to ring 45.

When the gasket 30 is pushed into engagement with the valve stem 25, the fingers 59 reflect outwardly as they pass over a shoulder on the valve stem. As described in the '532 patent the fingers snapped back to their undeflected position to retain the gasket on the valve stem 25.

The composite gasket 30 of FIGS. 5 and 6 is formed starting with a blank 60 of a high durometer elastomer. Blank 60 is provided with circular grooves 62 and 64 around the upper and lower surfaces of ring 45, respectively. A plurality of openings 66 connect the upper and lower recesses 62 and 64. Blank 60 may be formed from a PTFE resin or a relatively stiff elastomeric material such as Buna rubber with a Shore D durometer of approximately 49 to 55 (ASTM D2240).

To mold a composite gasket 30 blank 60 is placed in a mold 70 which is illustrated as being formed of upper mold component 72 and a lower mold component 74. The mold has 72 and 74 define a mold cavity 73 which conforms closely to the surfaces blank 60 except in the area of recesses 62 and 64. Suitable channel, gate, or screw is provided for the inflow into the mold cavity 73 of a moldable elastomeric material 80. Appropriate mold surfaces 78 and 79 are provided to form a sealing surface 47 and 82 on the composite gasket. The recesses 62 and 64 of blank 60 are coated with an adhesive or bonding agent in order to securely bond the soft rubber to the relatively harder material of blank 60.

Figure 2:
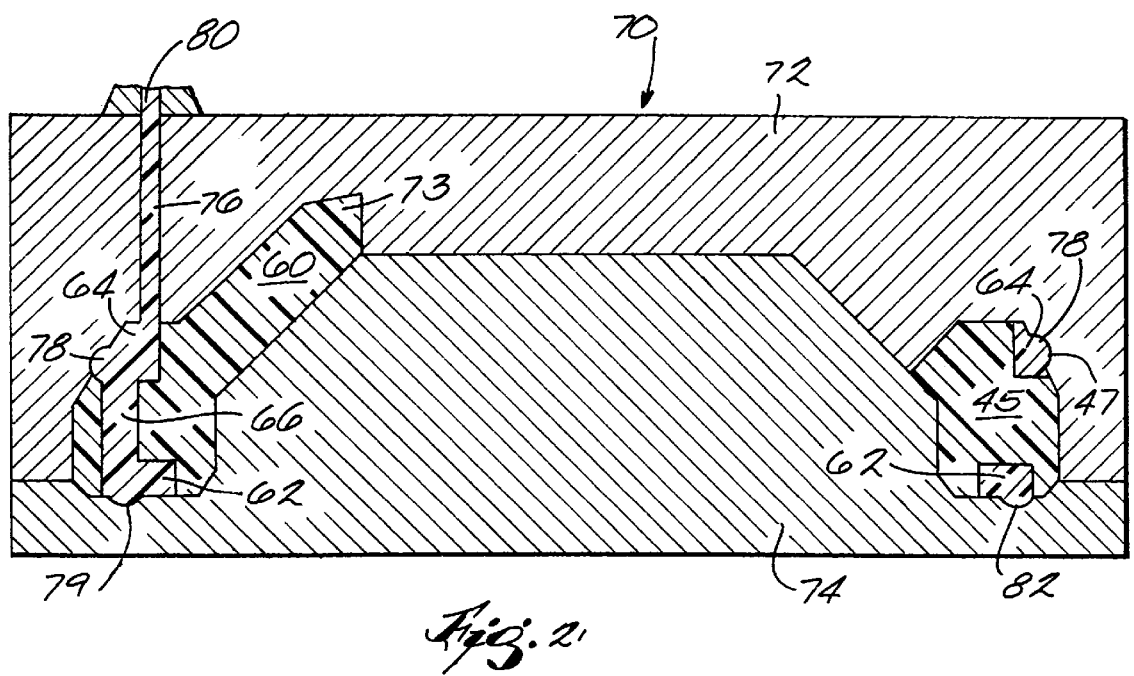
FIG. 2 is a cross-sectional side view of a mold assembly used in the process of forming gaskets in accordance with the invention.

As seen in FIG. 2 the series of openings 66 between upper recess 62 and lower recess 64 enables the flow of elastomer 80 to fill both the upper and lower recesses 62 and 64. After trimming any unwanted material from the screw area the composite gasket 30 shown in FIGS. 5 and 6 is obtained. The soft deformable elastomeric material may be for example, a Buna M rubber having a Shore A durometer hardness of approximately 60 to 70 (ASTM D2240).

As seen in FIGS. 5 and 6 the fact that the upper and lower recesses 62 and 64 are both filled with the relatively softer elastomer and are interconnected by the elastomer contained within the openings 66 located circumferentially around the gasket, the relatively softer elastomer is physically as well as adhesively bonded to the main body 60.

Figure 8:
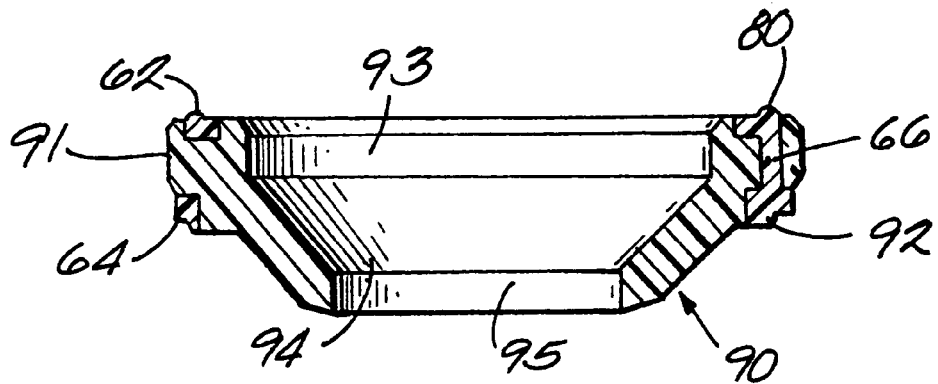
FIG. 8 is a sectional view taken along line 8—8 of FIG. 7.
Figure 7:
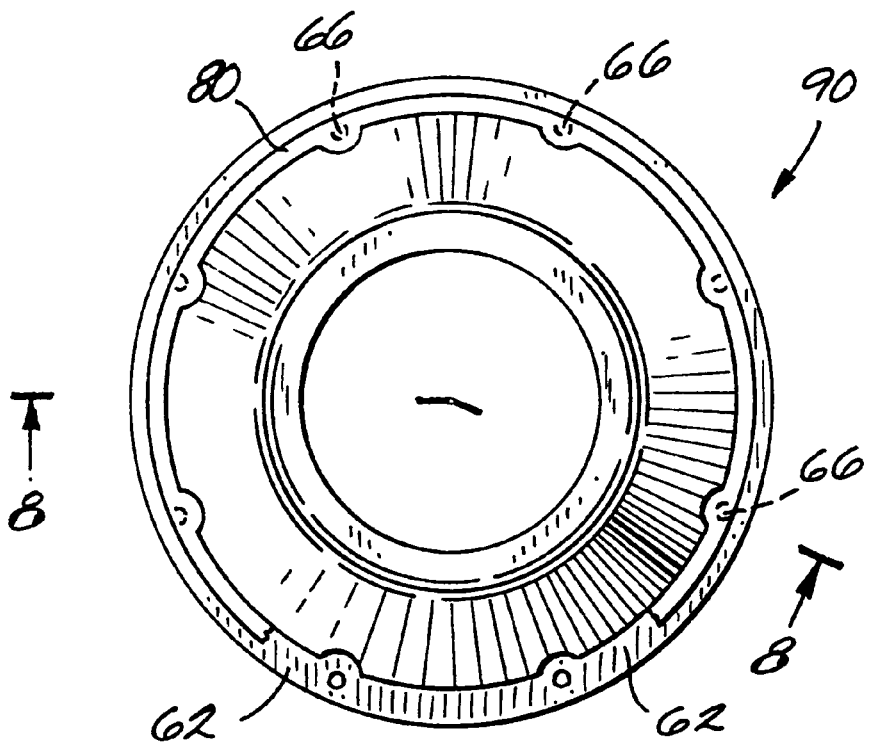
FIG. 7 is a top planned view with parts broken away showing a composite gasket in accordance with a further embodiment of the invention.

In the further embodiment shown in FIGS. 7 and 8 an alternative form of gasket 90 is illustrated. Gasket 90 is formed with the same general profile as gasket 30. A generally rectangular cross-section annular ring 91 is provided with an internal surface 93 and a frustal conical section 94 which terminates in surface 90. Surface 90 is of a circular configuration as seen in FIG. 7. This enables placement over a stem, for example, of a notched or non-circular configuration which enables snapping onto the valve stem of the gasket 90. As in the case of gasket 30 there are recesses on opposite sides of the ring 91. Openings 66 interconnect the recesses on the opposite sides of the ring 91. Thus, a relatively soft elastomer 80 is molded into the recesses using the connecting openings 67 to ensure flow of the elastomer into both of the recesses 62 and 64. A sealing surface 92 adapted to sealing engage a valve seat is provided. Also the sealing surface 82 completes the necessary sealing of the seat to the stem. In other respects the composite valve gasket 90 is similar to gasket 30.

Various adhesives or bonding agents may be used to bond together the hard and soft rubber materials to effect the purposes of the invention. Examples of suitable preferred bonding agents are paint-like materials such as those identified as Chemlock 205 or Chemlock 220 available from Lord Adhesive Co. Of Eire, Pa. Other adhesives include those based on nitrile copolymers, butadienes, natural rubber, organopolysiloxanes, methacrylic esters, block copolymers, acrylonitrile-butadiene-styrene (ABS) copolymers and copolymers of conjugated dienes and monoethylenically unsaturated monomers. Other suitable adhesives will be apparent to those skilled in the art.

It will be apparent to those skilled in the art that various polymers can be used for the hard and soft components of the composite gaskets. These include various thermoplastic moldable materials and rubber materials, both natural and synthetic. Molding conditions will vary depending on the particular hard and soft elastomers used, as will be appreciated by those skilled in the art.

I claim:

1. A valve gasket comprising
   a generally circular main body portion having opposed first and second surfaces and being formed of an organic polymeric elastomeric material having a hardness of a first durometer,
   said main body portion having first and second recesses located on said first and second opposed sides thereof and at least one opening through said main body portion connecting said first and second recesses,
   said first and second recesses and said opening being filled with an elastomeric material having a hardness of a second durometer, softer than said first durometer,
   at least one of said filled recesses forming a sealing surface of said gasket adapted to sealingly engage a valve seat.

2. A gasket according to claim 1 wherein said gasket is generally ring-shaped in configuration and said first and second recesses are on opposite sides of said ring.

3. A gasket according to claim 2 wherein said recesses each circumscribe the circumference of said ring.

4. A gasket according to claim 3 wherein a second side of said gasket is adapted to sealingly engage a stem seat.

5. A gasket according to claim 1 wherein said main body portion comprises Buna rubber having a Shore D durometer hardness of about 49 to 55.

6. A gasket according to claim 5 wherein said elastomeric material which fills said recesses comprises a Buna M rubber having a Shore A durometer hardness of about 60 to 70.

7. A valve gasket comprising a generally ring-shaped main body portion formed of an polymeric material having a hardness of a first durometer, said main body portion having first and second recesses located on opposed sides first and second sides thereof and at least one opening through said body connecting said first and second recesses, said first and second recesses and said opening being filled with an elastomeric material having a hardness of a second durometer, softer than said first durometer, said polymeric material and said elastomeric material being adhesively bonded to each other, at least one of said filled recesses forming a sealing surface of said gasket adapted to sealingly engage a valve seat.

8. A gasket according to claim 7 wherein said gasket is generally ring-shaped in configuration and said first and second recesses are on opposite sides of said ring.

9. A gasket according to claim 7 wherein said polymeric material wherein said adhesive bonding is effected by an adhesive material based on a polymer selected from the group consisting of nitrile copolymers, butadienes, natural rubber, organopolysiloxanes, methacrylic esters, block copolymers, acrylonitrile-butadiene-styrene (ABS) copolymers and copolymers of conjugated dienes and monoethylenically unsaturated monomers.

* * * * *